US011859812B2

(12) United States Patent
Ström et al.

(10) Patent No.: US 11,859,812 B2
(45) Date of Patent: Jan. 2, 2024

(54) RECOVERY OF CHEMICALS FROM FUEL STREAMS

(71) Applicant: BioShare AB, Karlstad (SE)

(72) Inventors: Henrik Ström, Stenungsund (SE); David Pallarès, Gothenburg (SE); Henrik Thunman, Partille (SE); Martin Seemann, Gothenburg (SE); Christer Gustavsson, Karlstad (SE)

(73) Assignee: BioShare AB, Karlstad (SE)

( * ) Notice: Subject to any disclaimer, the term of this patent is extended or adjusted under 35 U.S.C. 154(b) by 831 days.

(21) Appl. No.: 16/620,510

(22) PCT Filed: Jun. 11, 2018

(86) PCT No.: PCT/IB2018/054187
§ 371 (c)(1),
(2) Date: Dec. 8, 2019

(87) PCT Pub. No.: WO2018/225046
PCT Pub. Date: Dec. 13, 2018

(65) Prior Publication Data
US 2020/0141570 A1 May 7, 2020

Related U.S. Application Data

(60) Provisional application No. 62/517,186, filed on Jun. 9, 2017.

(30) Foreign Application Priority Data

Nov. 1, 2017 (FI) .................................... 20170148

(51) Int. Cl.
F22B 31/00 (2006.01)
B01J 8/24 (2006.01)
(Continued)

(52) U.S. Cl.
CPC ............. *F23C 10/10* (2013.01); *B01J 8/1809* (2013.01); *B01J 8/1818* (2013.01); *B01J 8/1827* (2013.01);
(Continued)

(58) Field of Classification Search
CPC ........ F23C 10/10; F23C 10/005; F23C 10/06; F23C 10/30; F23C 10/20; F23C 10/28;
(Continued)

(56) References Cited

U.S. PATENT DOCUMENTS 2,656,258 A 10/1953 Fred et al.
4,102,773 A 7/1978 Green et al.
(Continued)

FOREIGN PATENT DOCUMENTS

CN 1330700 A * 1/2002 ............. B01D 53/02
CN 109945172 B 9/2020
(Continued)

OTHER PUBLICATIONS

English translation of CN 109945172, cited in Swedish patent application No. 2230025-5 (dated Sep. 4, 2020).
(Continued)

*Primary Examiner* — Kaity V Chandler
(74) *Attorney, Agent, or Firm* — Bresbo AB

(57) ABSTRACT

Various aspects provide for a multistage fluidized bed reactor, particularly comprising a volatilization stage and a combustion stage. The gas phases above the bed solids in the respective stages are separated by a wall. An opening (e.g., in the wall) provides for transport of the bed solids from the volatilization stage to the combustion stage. Active control of the gas pressure in the two stages may be used to control residence time. Various aspects provide for a fuel stream processing system having a pretreatment reactor, a combustion reactor, and optionally a condensation reactor. The
(Continued)

condensation reactor receives a volatiles stream volatilized by the volatilization reactor. The combustion reactor receives a char stream resulting from the removal of the volatiles by the volatilization reactor.

19 Claims, 5 Drawing Sheets

(51) Int. Cl.
| | |
|---|---|
| F23C 10/20 | (2006.01) |
| F23C 10/28 | (2006.01) |
| F23C 10/10 | (2006.01) |
| F23C 10/00 | (2006.01) |
| C10J 3/48 | (2006.01) |
| C10J 3/72 | (2006.01) |
| F23C 10/06 | (2006.01) |
| F23C 10/30 | (2006.01) |
| B01J 8/18 | (2006.01) |
| B01J 8/26 | (2006.01) |
| B01J 8/34 | (2006.01) |
| B01J 8/36 | (2006.01) |
| F15D 1/00 | (2006.01) |

(52) U.S. Cl.
CPC .............. *B01J 8/1836* (2013.01); *B01J 8/26* (2013.01); *B01J 8/34* (2013.01); *B01J 8/36* (2013.01); *C10J 3/48* (2013.01); *C10J 3/482* (2013.01); *C10J 3/723* (2013.01); *F15D 1/00* (2013.01); *F23C 10/005* (2013.01); *F23C 10/06* (2013.01); *F23C 10/30* (2013.01); *B01J 8/24* (2013.01); *B01J 2208/00539* (2013.01); *B01J 2208/00566* (2013.01); *B01J 2208/00849* (2013.01); *B01J 2208/00902* (2013.01); *B01J 2208/00938* (2013.01); *C10J 2200/09* (2013.01); *C10J 2200/152* (2013.01); *C10J 2300/0916* (2013.01); *C10J 2300/0956* (2013.01); *C10J 2300/0959* (2013.01); *C10J 2300/0976* (2013.01); *C10J 2300/1637* (2013.01); *F22B 31/0092* (2013.01); *F23C 10/20* (2013.01); *F23C 10/28* (2013.01); *F23C 2206/101* (2013.01); *F23C 2206/102* (2013.01); *F23C 2900/06041* (2013.01); *F23C 2900/10005* (2013.01)

(58) Field of Classification Search
CPC .......... F23C 2206/101; F23C 2206/102; F23C 2900/06041; F23C 2900/10005; B01J 8/1809; B01J 8/1818; B01J 8/1827; B01J 8/1836; B01J 8/26; B01J 8/34; B01J 8/36; B01J 8/24; B01J 2208/00539; B01J 2208/00566; B01J 2208/00849; B01J 2208/00902; B01J 2208/00938; B01J 2208/0084; B01J 8/44; C10J 3/48; C10J 3/482; C10J 3/723; C10J 2200/09; C10J 2200/152; C10J 2300/0916; C10J 2300/0956; C10J 2300/0959; C10J 2300/0976; C10J 2300/1807; F15D 1/00; F22B 31/0092; Y02E 20/16; C10G 1/02; Y02P 30/20; F23B 90/06; F27B 15/18

See application file for complete search history.

(56) References Cited

U.S. PATENT DOCUMENTS

| | | |
|---|---|---|
| 4,225,415 A | 9/1980 | Mirza et al. |
| 4,276,062 A | 6/1981 | Lyon et al. |
| 4,682,986 A | 7/1987 | Lee et al. |
| 4,823,712 A | 4/1989 | Wormer |
| 4,828,486 A | 5/1989 | Sakamoto et al. |
| 5,961,786 A | 10/1999 | Freed et al. |
| 6,530,978 B2 | 3/2003 | McQuigg et al. |
| 7,214,252 B1 | 5/2007 | Krumm |
| 8,500,959 B2 | 8/2013 | Lehto |
| 9,580,657 B2 | 2/2017 | Heydenrych et al. |
| 2006/0000143 A1 | 1/2006 | Nagato et al. |
| 2006/0137579 A1 | 6/2006 | Fujimura et al. |
| 2007/0014704 A1 | 1/2007 | Hashimoto et al. |
| 2007/0283902 A1 | 12/2007 | Maryamchik et al. |
| 2009/0065437 A1 | 3/2009 | Mohedas |
| 2010/0024297 A1 | 2/2010 | Suda et al. |
| 2011/0042277 A1 | 2/2011 | Briens et al. |
| 2011/0073049 A1 | 3/2011 | Maryamchik et al. |
| 2012/0012039 A1 | 1/2012 | Palmas et al. |
| 2012/0073185 A1* | 3/2012 | Jokela ................. C10B 53/00 44/307 |
| 2013/0064722 A1 | 3/2013 | Lankinen |
| 2013/0098277 A1 | 4/2013 | Kawai et al. |
| 2013/0327629 A1 | 12/2013 | Palmas et al. |
| 2014/0102342 A1 | 4/2014 | Maryamchik et al. |
| 2015/0118723 A1 | 4/2015 | Duzoglou |
| 2016/0130503 A1 | 5/2016 | Heydenrych |
| 2016/0290632 A1 | 10/2016 | Pohl et al. |
| 2017/0120211 A1 | 5/2017 | Kamal et al. |
| 2017/0189877 A1 | 7/2017 | Abdullah et al. |
| 2019/0048273 A1 | 2/2019 | Verberne et al. |

FOREIGN PATENT DOCUMENTS

| | | | |
|---|---|---|---|
| EP | 0 597 683 A2 | 5/1994 | |
| EP | 1 043 385 A1 | 10/2000 | |
| EP | 2 428 546 A1 | 3/2012 | |
| EP | 3 287 197 A1 | 2/2018 | |
| FI | 112087 B | 12/2001 | |
| FR | 2.203.964 | 5/1974 | |
| GB | 1 508 777 A | 4/1978 | |
| JP | 2006132885 | 5/2006 | |
| JP | 2016 138694 A | 8/2016 | |
| WO | WO-2010139854 A1 * | 12/2010 | ............. C10B 49/10 |
| WO | WO 2011/0454473 A1 | 4/2011 | |

OTHER PUBLICATIONS

Office action issued by the Swedish patent office in Swedish patent application No. 2230025-5 (dated Sep. 2022).
U.S. Appl. No. 17/251,242, Pallarès, David, Srpay, Jet, and/or Splash Induced Circulation Among Integrated Bubbling Zones in a Bubbling Fluidized Bed Reactor, filed Dec. 11, 2020.
U.S. Appl. No. 16/973,814, Gustavsson, Christer, Biomass Upgrading System, filed Dec. 10, 2020.
"Added value from biomass by broader utilization of fuels and CHP plants," Gustavsson, Christer; Doctoral Thesis, Karlstad University, Dec. 2016.
"Biomass pyrolysis for liquid biofuels: production and use" Rizzo, Andrea Maria; Doctoral Thesis, University of Florence, Dec. 2014.
"Challenges and opportunities with an industrial-scale integrated bio-oil plant" Autio, Joakim et al, IEA Bioenergy Conference, Vienna, Austria (Nov. 2012).
"Control of the solids retention time by multi-staging a fluidized bed reactor," Zhao, Ke et al; Fuel Processing Technology 167, 171-182 (Jul. 2017).
Office action issued by the Finnish patent office in related application, FI patent application No. 20170148 (dated Mar. 2018).
English Abstract transation (WIPO) of JP 2006132885, Combustion Method and Device for Wet Waste, (May 2006).
Machine translation of JP 2006132885, Combustion Method and Device for Wet Waste, (May 2006).
Response to Office action issued by the Finnish patent office in related application, FI patent application No. 20170148 (dated Jun. 2018).
International Search Report, Written Opinion, and Search Strategy for related application PCT/IB2018/054187 dated Dec. 2018.

(56) References Cited

OTHER PUBLICATIONS

Response to ISR/WO in PCT/IB2018/054187) filed with entry into the European regional phase for European patent application No. 1873 9642.9 dated Jan. 2020.
1st Office action issued by the European Patent Office in European patent application No. 1873 9642.9 dated Feb. 2021.
Response to 1st offfice action issued by the European Patent Office in European patent application No. 1873 9642.9 dated Jun. 2021.
2nd Office action issued by the European Patent Office in European patent application No. 1873 9642.9 dated Aug. 2021.
Response to 2nd office action issued by the European Patent Office in European patent application No. 1873 9642.9 dated Feb. 2022.
1st Office action issued by the Swedish Patent Office in Swedish patent application No. 2030005-9 dated Aug. 2020.
Response to 1st Office action issued by the Swedish Patent Office in Swedish patent application No. 2030005-9 dated Feb. 2021.
Supplemental response to 1st Office action issued by the Swedish Patent Office in Swedish patent application No. 2030005-9 dated Oct. 2021.
International Search Report, Written Opinion, and Search Strategy for related application PCT/IB2018/054189 dated Dec. 2018.
International Search Report, Written Opinion, and Search Strategy for related application PCT/IB2018/059806 dated Dec. 2019.
Response to ISR/WO in PCT/IB2018/059806) filed with entry into the European regional phase for European patent application No. 1883 0946.2 dated Dec. 2020.
1st Office action issued by the European Patent Office in European patent application No. 18 830 946.2 dated Aug. 2021.
Response to 1st Office action issued by the European Patent Office in European patent application No. 18 830 946.2 dated Dec. 2021.
1st Office action issued by the Swedish Patent Office in Swedish patent application No. 2030362-4 dated Sep. 2021.
Response to 1st Office action issued by the Swedish Patent Office in Swedish patent application No. 2030362-4 dated Jan. 2022.
International Search Report, Written Opinion, and Search Strategy for related application PCT/IB2019/054766 dated Dec. 2019.
Response to ISR/WO in PCT/IB2019/054766 filed with entry into the European regional phase for European patent application No. 1974 2914.5 dated Dec. 2020.
1st Office action issued by the Swedish Patent Office in Swedish patent application No. 2030363-2 dated Sep. 2021.
Response to 1st Office action issued by the Swedish Patent Office in Swedish patent application No. 2030363-2 dated Mar. 2022.
2nd Office action issued by the Swedish Patent Office in Swedish patent application No. 2030362-4 dated Dec. 2022.
Response to 2nd Office action issued by the Swedish Patent Office in Swedish patent application No. 2030362-4, dated Apr. 2023.
International Search Report and Written Opinion prepared by the EPO in PCT patent application PCT/IB2023/050596 dated May 2023.

\* cited by examiner

RECOVERY OF CHEMICALS FROM FUEL STREAMS

CROSS REFERENCE TO RELATED APPLICATIONS

The present application is the National Stage of PCT patent application no. PCT/IB2018/054187, which claims the priority benefit of US provisional patent application no. 62/517,186, filed Jun. 9, 2017, and to FI patent application no 20170148, filed Nov. 1, 2017. The present application is related to PCT patent application no. PCT/IB2018/054189, filed Tune 11, 2018 and titled "Bubbling Fluidized Bed Reactor with Circulation Among Integrated Bubbling Zones." Each of these references is incorporated by reference herein.

BACKGROUND

1. Technical Field

The present invention relates generally to the recovery of volatile species from fuels, and more particularly to the extraction and/or isolation of chemicals from fuel streams in fluidized bed systems.

2. Description of Related Art

A combustion plant burns a fuel (e.g., wood, coal, gas, oil, waste products, and the like) to generate useful heat and/or electricity. A Combined Heat and Power (CHP) plant may generate electricity using a first portion of the combustion heat to drive a turbine and then a remaining portion of heat in another process (e.g., in a second thermal cycle, for industrial use, for district heating, and the like).

FIG. 1 illustrates a typical fluidized bed (FB) boiler 100, in which a granular bed of bed solids suspends the (typically solid pieces of) fuel 101 within a combustion container. Air 102 flows upward through holes in a distributor plate in the floor of the combustion container. Using appropriately sized solid particles, air distribution plate, and air flow, the bed 103 becomes "fluidized" by the upwardly flowing air. A fluidized bed may behave as a liquid, notwithstanding that the bed is formed primarily of solid particles intermingled with a gas phase 104. In a typical fluidized bed plant, the fuel is ground or cut into pieces, which are fed into the fluidized bed to combust with incoming air (e.g., from the bottom of the bed, also possibly from the side) to generate heat. Combustion heat is often used to generate steam via a heat exchanger 105, which may be used directly and/or converted to electricity. The resulting flue gas 106 is treated to by a flue gas treatment 107 to remove dust 108 (e.g., as fly ash, bottom ash) and exhaust 109 is exhausted to the atmosphere.

Typical fluidized bed reactors are based on either so-called circulating fluidized bed (CFB) or so-called bubbling fluidized bed (BFB) designs. CFB reactors utilize smaller particles than BFB. A CFB reactor in a combustion application typically has a mean particle size between 0.2 and 0.4 mm, whereas a BFB has a mean particle size that is approximately 1 mm. The larger particles of BFB lend themselves to "bubbling" under economic reaction conditions. CFB reactors are based on "fast" fluidization, thereby utilizing much higher gas velocities than those associated with the bubbling regime (itself below the turbulent regime). The resulting "dust storm" of entrained particles and fuel in a typical circulation regime is entirely different than the discrete, dense, "bed phase" of a bubbling fluidized bed, notwithstanding the "CFB" nomenclature.

The small particle sizes of CFB lend themselves to long-distance, convective, gas-entrained circulation (like a dust storm). In prior 2-reactor CFB systems, circulation of particles from a first reactor to a second reactor and back entails the use of a riser after one of the circulation reactors, followed by separation of the particles from the gas phase (typically with a cyclone). The riser carries the particles upwards, after which they are separated from the gas phase and dropped via a downcomer back to the other reactor. The reactors are spatially separated from each other, with duct-work guiding a convective "wind" that carries particles through the ducts between reactors.

Typical CFB-circulation designs do not work well (and are often incompatible with) BFB particles. Circulation of the relatively large BFB particles in prior CFB designs require very high gas velocities to lift the particles in the riser and/or separate them in the cyclone. These high velocities are expensive to generate and difficult to manage. The large, high velocity particles are erosive and readily damage the walls and other surfaces of the plant.

Conversely, the use of CFB particles in a BFB is also problematic. The use of the relatively smaller CFB particles in a BFB requires the use of relatively low gas velocities (in the bubbling bed) to properly "bubble" the bed of CFB particles. As a result, very large beds are required to achieve desired reaction rates.

Various references describe adding a fluidization bed to a circulating fluidized bed (CFB) combustor. JP 2005-274015 A, JP 2004-132621A, JP 2005-41959A, JP 2006132885, and US 2010/0024297 describe a CFB combustor having a riser/cyclone/downcomer circuit to recycle particles from the CFB combustor into another fluidized bed. U.S. Pat. No. 4,823,712 describes the use of screw conveyors to transport solids between beds. Such conveyors are prone to erosion by the solids.

SUMMARY

Various aspects provide for a multistage fluidized bed reactor comprising separate stages (typically separated by one or more walls). A common bed may have multiple stages, each with its own fluidization gas. A wall separates at least the gas phases above each stage, such that the reaction products formed in each stage may be kept separate. Bed solids and fuel/char may flow between stages, while the gas phases remain separate, enabling sequential chemical reactions. Each stage may be operated as its own reactor. Independent control of the gas pressure between the stages, combined with an appropriately dimensioned communication passage between the stages, enables a controlled transport of media (gas, bed solids) between the beds of the stages. Various aspects may be used to control residence times and reaction rates within a stage, and heat and/or mass transfer between the stages, enabling a wide range of chemical reactions. For simplicity, stages are described using a (less oxidizing) volatilization stage and a (more oxidizing) combustion stage. Other reactions and gases may be implemented (e.g., a first stage is reducing and a second stage is mildly oxidizing, and/or a first stage is hotter/colder than a second stage). Aspects are described with independent pressure control; some multi-stage reactors need not have independent pressure control.

In an embodiment, a fluidized bed reactor configured to read a fuel in a fluidized bed of bed solids comprises a container configured to hold the bed of solids, and one or more walls separating the container(s) into at least a first (e.g., volatilization) stage and a second (e.g., combustion) stage. Typically, a single container includes both the volatilization and combustion stages, sharing a common bed, with a wall separating the gas phases of the stages, with each stage having its own gas supply for fluidization. Each stage may be operated as its own reactor, with their respective gaseous reaction products separated by the wall. The wall has an opening below the bed height (buried in the bed) such that solids may flow between the stages. As such, an incoming material to be reacted may be subjected to a first reaction in a first stage, then flow to the second stage with the bed solids, then be subjected to a second reaction in the second stage. Both stages may be operated as bubbling fluidized bed (BFB) reactors. The bed solids may have a mean particle diameter that is at least 0.4 mm, including at least 0.6 mm, particularly at least 0.75 mm, particularly at least 0.9 mm. Particles are typically below 2 mm, including up to 1.5 mm.

The wall between the volatilization and combustion stages separates at least the gas phases in the stages. An opening between the stages provides for transport of bed solids and char between the stages. The opening may be in the wall separating the stages. The opening may be in the floors or walls of the stages (e.g., openings in the floors connected via a pipe).

At least one stage (typically at least the volatilization stage) has a fuel inlet configured to receive the fuel, and one or more gas inlets at the bottom of the container to fluidize the bed within the stage. A LowOx gas supply configured to supply (typically hot) volatilization gas to the gas inlets provides a gas pressure and flow rate sufficient to fluidize the bed solids and volatilize the fuel to yield a (predominantly gaseous) volatiles stream and a char stream (comprising residual carbonaceous species, or "char"). Typically, an inert, reducing, or mildly oxidizing gas (e.g., $N_2$, syngas, steam, and the like) is used in the volatilization stage, enabling the creation of a volatiles stream having valuable chemical species. A volatiles stream outlet conveys the volatiles stream out of the volatilization stage and a char stream outlet may convey the char stream (and typically some bed solids) out of the volatilization stage via the opening. A volatiles stream is typically predominantly gaseous, possibly with some small entrained particulates of liquid or solid (e.g., mist, dust). In an embodiment, the volatiles stream comprises biomass vapor, raw gas, wood gas, cellulose, hemicellulose, lignin, (and/or fractions thereof), polymers, monomers, wood extractives, syngas, fine chemicals, droplets of biomass, and the like. By having an independently controlled fluidization gas and ambient gas (composition, pressure, temperature), the volatilization stage may be used to extract chemicals from the fuel prior to combustion in the combustion stage.

The combustion stage may have a char stream inlet configured to receive the char stream (typically with some bed solids) from the volatilization stage. One or more oxidant gas inlets at the bottom of the combustion stage are coupled to a HiOx gas supply configured to deliver a relatively more oxidizing gas than that of the volatilization stage (e.g., air, O2, and the like) to fluidize the bed of solids in the combustion stage and combust the char stream to yield an exhaust gas. An exhaust gas outlet conveys the exhaust gas out of the combustion stage. Typically, the exhaust gas is used to generate electricity (e.g., with a gas turbine and/or steam turbine), and or may flow through a heat exchanger for extraction of the exhaust heat (e.g., for district heating, process heat, and the like).

An opening (e.g., in the wall or floor) couples the fluidized beds in the volatilization and combustion stages (e.g., via the char stream outlet/inlet) such that bed solids and char may flow between the stages, even though the gas phases are substantially separated. The volatilization stage and/or outlet may include a volatiles pressure gauge configured to measure the gas pressure within the volatilization stage, and the combustion stage and/or outlet includes a combustion pressure gauge configured to measure pressure within the combustion stage; these pressures are typically independently controlled.

A reactor may comprise separate stages in a contiguous bed of bed solids, each having its own fluidization gas, and a wall separating at least the gas phases above each stage. The reactor may include one or more means to control gas flow into and/or out of a stage. The volatilization stage may include a volatiles outlet valve fluidically coupled to the volatiles stream outlet (typically sufficiently downstream to prevent fouling and/or problems due to high temperature) and configured to controllably restrict gas flow through the volatiles stream outlet. The combustion stage may include an exhaust valve (e.g., coupled to the exhaust gas outlet) configured to controllably restrict gas flow out of the combustion stage. Either or both stages may include a fan (e.g., coupled to a fuel inlet or gas outlet, such as an induced draft fan) configured to controllably pump gas into or extract gas from the stage. A controllable gas source/gas inlet may be used to pressurize a stage. Pressure/flow rate of the fluidizing gas (e.g., the LowOx and/or HiOx supply) may be used to control pressure within a stage.

A controller is coupled to the pressure gauges and configured to measure the pressures within the volatilization and combustion stages (e.g., to measure a pressure difference). The controller is coupled to the means to control gas flow, such that a desired pressure difference between stages (according to the pressure gauges) may be maintained via operation of the gas flow means, typically using closed-loop control. A controller may control a volatiles outlet valve (restricting gas flow out of the volatilization stage) and/or an exhaust fan (extracting gas from the combustion stage).

The controller operates the gas flow control means to achieve a desired pressure difference between the beds, which may be used to control residence time, reaction rates, convection (within and between beds), and/or the transfer rate of char from the volatilization stage to the combustion stage. During steady state operation, the controller may control the residence time of fuel particles via the pressure difference. A longer residence might lead to an increased degree of volatilization (and thereby to a reduced amount (flow) of char). Typically, the controller controls the pressure in the volatilization stage to be greater or less than the pressure in the combustion stage, according to a desired reaction and residence time in each stage. This pressure difference may be used to controllably drive a flow of the char stream and bed solids from the volatilization stage to the combustion stage via the opening/char stream outlet/char stream inlet (e.g., by decreasing, then increasing, pressure in the volatilization stage to "breathe" or "flush" the char to the combustion stage). The velocity/pressure of the fluidization gas may be controlled (e.g., with the stage pressure) to control a residence time of fuel and/or char within a stage. Gas inlet velocities and ambient pressures may be controlled to independently raise and lower the fluidized bed height of each stage.

The separation of the gas phases in the volatilization and combustion stages enables the capture and separate utilization of products of reactions that use different fluidization gases in the respective stages and/or the production of different chemical species within each stage. An inert and/or less oxidizing gas is typically used for fluidization in the volatilization stage. The volatilization stage volatilizes (e.g., pyrolyzes/gasifies/evaporates/reforms) or otherwise reads the fuel to form volatiles and char, after which the char is transferred to the combustion stage. Volatilization may include partial oxidation, but typically does not result in complete oxidation (thus the residual char).

The system may include a separation reactor configured to receive the volatiles stream from the volatilization stage. The separation reactor may include a heat exchanger, a condenser, a separator configured to separate phases and/or species, an ESP, bag house, a cyclone, and the like. The separation reactor typically separates out at least one chemical species from the volatiles stream, and may separate out a residual stream, which may be routed to a combustion reactor.

The system may include a heat exchanger, particularly coupled to the exhaust gas outlet and the inert gas supply and configured to transfer heat from the combustion stage to pre-heat the gas used in the volatilization stage. A heat exchanger may improve the thermal efficiency of the system. A heat exchanger may be coupled to a volatiles stream (e.g., to condense species out of the stream).

A stage may comprise one or more internal walls and/or baffles. A volatilization stage may include an internal wall between the fuel inlet and volatiles stream outlet, configured to separate the gas phase proximate to the fuel inlet from that of the volatiles exiting the volatilization stage. The internal wall may extend down into the fluidized bed (preventing gas transfer). Such a configuration may obligate incoming fuel and/or volatile species to pass through the bed for at least some minimum time. In an embodiment, an internal wall separates the volatilization stage into an inlet stage and a reforming stage. In some cases, the wall ends just above the fluidized bed (allowing some gas phase transfer).

A stage divided by an internal wall may include separate pressure gauges and valves, correspondingly coupled to the controller to provide for independent pressure control over the various portions of the stage. For example, an internal wall may extend into the bed in the volatilization stage, separating the volatilization stage into an inlet stage (with the fuel inlet) having an inlet pressure gauge (and optionally an inlet gas valve and/or inlet gas supply) and a reforming stage having a reforming pressure gauge and the volatiles stream outlet. The controller may be coupled to the gauges and/or valves and further configured to independently control the gas pressures of the inlet stage, reforming stage, and/or combustion stages. Such a configuration may offer fuel pretreatment (e.g., dehydration) under first conditions, then volatilization (e.g., pyrolysis) under second conditions, prior to combustion under third conditions. Drying and volatilization may occur under first conditions, and reforming under second conditions.

A stage may comprise a baffle disposed at the bottom of the bed, at the top of the bed (e.g., from below the bed surface to above the bed surface) and/or within the bed. A baffle disposed at the top of the bed may block solid material (e.g., floating on top of the bed solids) while allowing mass transfer below or above the baffle. In an embodiment, the volatilization stage (e.g., an inlet stage) includes a baffle disposed at the top of the bed, configured to force non-gaseous phases floating on the surface of the bed (e.g., fuel, char, or other condensed phases) to pass below the baffle (e.g., to get from one stage to the next). A baffle may be used to impose a minimum residence time within the bed, which may more fully read large pieces of fuel. Bed height may be raised by decreasing pressure and/or increasing gas velocity within the stage, changing the relative effect of the baffle on the stage.

Various aspects provide for a fuel stream processing system to "pre-treat" a fuel stream to extract volatile species from the fuel prior to combustion, rather than burning them immediately. A pretreatment reactor may pretreat the fuel stream via heating in an inert, partially oxidizing, and/or reducing environment to volatilize/pyrolyze/gasify/reform (herein: volatilize) various molecules. A pretreatment reactor outputs a volatiles stream that (according to fuel and reaction conditions) may include syngas, gaseous species, biofuels and/or biofuel precursors, chemicals, and the like.

The pretreatment reactor may include a volatilization stage, and in some cases, a fast "flash" pyrolysis reactor is used. In the case of flash pyrolysis, the volatiles stream is conveyed from the pyrolysis reactor to a separation/condensation/fractionation reactor, which quickly condenses the volatiles and segregates them (e.g., by condensation point). Pretreatment may (but need not) be performed in a fluidized bed reactor, which may be fluidically coupled to a combustion reactor (e.g., a fluidized bed combustor) via the bed solids. A separation reactor may be implemented to separate various species. The segregated species may be removed for subsequent use (e.g., purification, additional processing). A residual stream may be sent from the condensation/fractionation reactor to the combustion reactor for burning.

A multistage fluidized bed reactor (e.g., comprising separate volatilization and combustion stages) may be implemented as a fuel stream processing system. For convenience, certain components (e.g., inlets, outlets) of such a reactor are illustrated in the context of a fuel stream processing system.

A method may comprise delivering a fuel (e.g., wood, straw, bark, garbage, MSW, sewage, and the like) to the volatilization stage, fluidizing the fluidized bed in the volatilization stage with the inert, less oxidizing, and/or reducing gas, and volatilizing at least a portion of the fuel to form char, which is passed to a combustion stage to be combusted with a relatively more oxidizing gas. By controlling a pressure difference between the stages and the pressures/flow rates of the fluidization gases, residence times may be controlled to achieve a desired reaction. A method may comprise controlling a flow of char and bed solids from the volatilization stage to the combustion stage by controlling a pressure difference between the stages. Residence times and/or convection within and/or between stages may be used to control reaction rates, heat transfer, and mass transfer within and/or between stages.

DETAILED DESCRIPTION

The reduction, reuse, and recycling of waste streams is an increasingly important priority in many societies. Some waste streams are burned (e.g., for heat and/or electricity). While combustion might utilize the fuel value of a waste stream, the chemical properties of certain components of the fuel might be substantially more valuable if they were they utilized for chemical purposes, rather than as fuel. Some waste streams (municipal solid waste, dehydrated sewage) contain small quantities of chemicals that have very high value. Certain components of biomass (e.g., wood species) may have very high value.

Waste fuel streams such as municipal solid waste (MSW), sewage, and the like, and nonwaste fuel streams, such as petrochemicals, biomass and the like, comprise a wide range of molecules. Some of these molecules (or portions thereof) are valuable beyond their use as a fuel supply. Systems and methods described herein may be implemented to recover chemicals that might otherwise be combusted, enabling the subsequent use of these chemicals in higher-value applications.

A fuel stream processing system may comprise a pretreatment reactor (e.g., to pyrolyze/evaporate/volatilize/gasify/reform a fuel) and a combustion plant. A fuel stream flows into the pretreatment reactor to be reacted to form a volatiles stream and a char stream. The pretreatment reactor may pyrolyze/gasify/volatilize/precombust or otherwise read a solid or liquid fuel prior to its passage to the combustion plant, typically with an inert, reducing, or mildly oxidizing gas (e.g., $N_2$, syngas, steam, and the like). The char stream flows into the combustion plant, where it is combusted. The pretreatment reactor may be retrofit to an existing combustion plant (e.g., with an additional fuel supply).

The volatiles stream may be used directly. For example, a fuel may be separated into a first fuel source (e.g., for a separate combustion process, such as an engine or turbine) and a residual char source (e.g., for combustion in a fluidized bed). A volatiles stream may flow to a separation reactor, which typically cools the volatiles stream to condense and separate out one or more (typically >5, including >10, including >100) chemical species from the volatiles stream. The separated chemical species may be subsequently processed and/or utilized. The chemical species may include syngas ($H_2$+CO), gaseous hydrocarbons (including oxygenated hydrocarbons), liquid fuels (e.g., C4-C16) such as biofuels and/or biofuel precursors, volatile polymers, fuel gas, chemical compounds, fine chemicals, and the like. A residual stream (remaining, undesired chemicals which may have fuel value) may be routed to the combustion plant and combusted. A stream may be routed to a kiln, furnace, or other apparatus where it is combusted.

Figure 1:
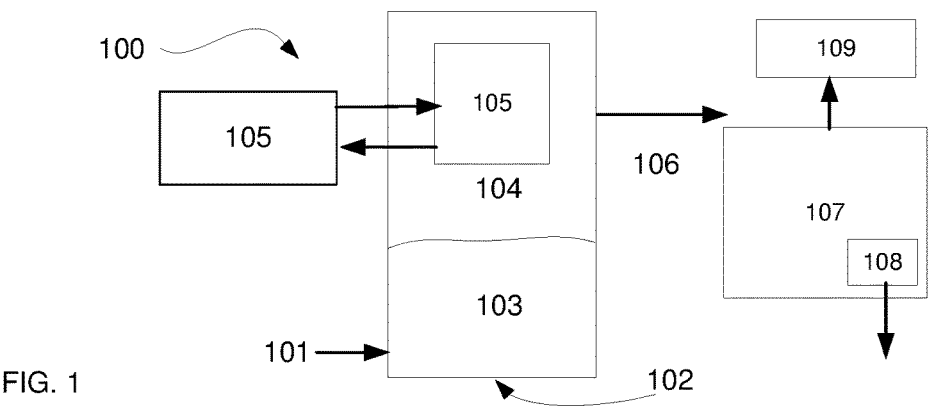
FIG. 1 is a schematic illustration of a typical fluidized bed boiler.
Figure 2:
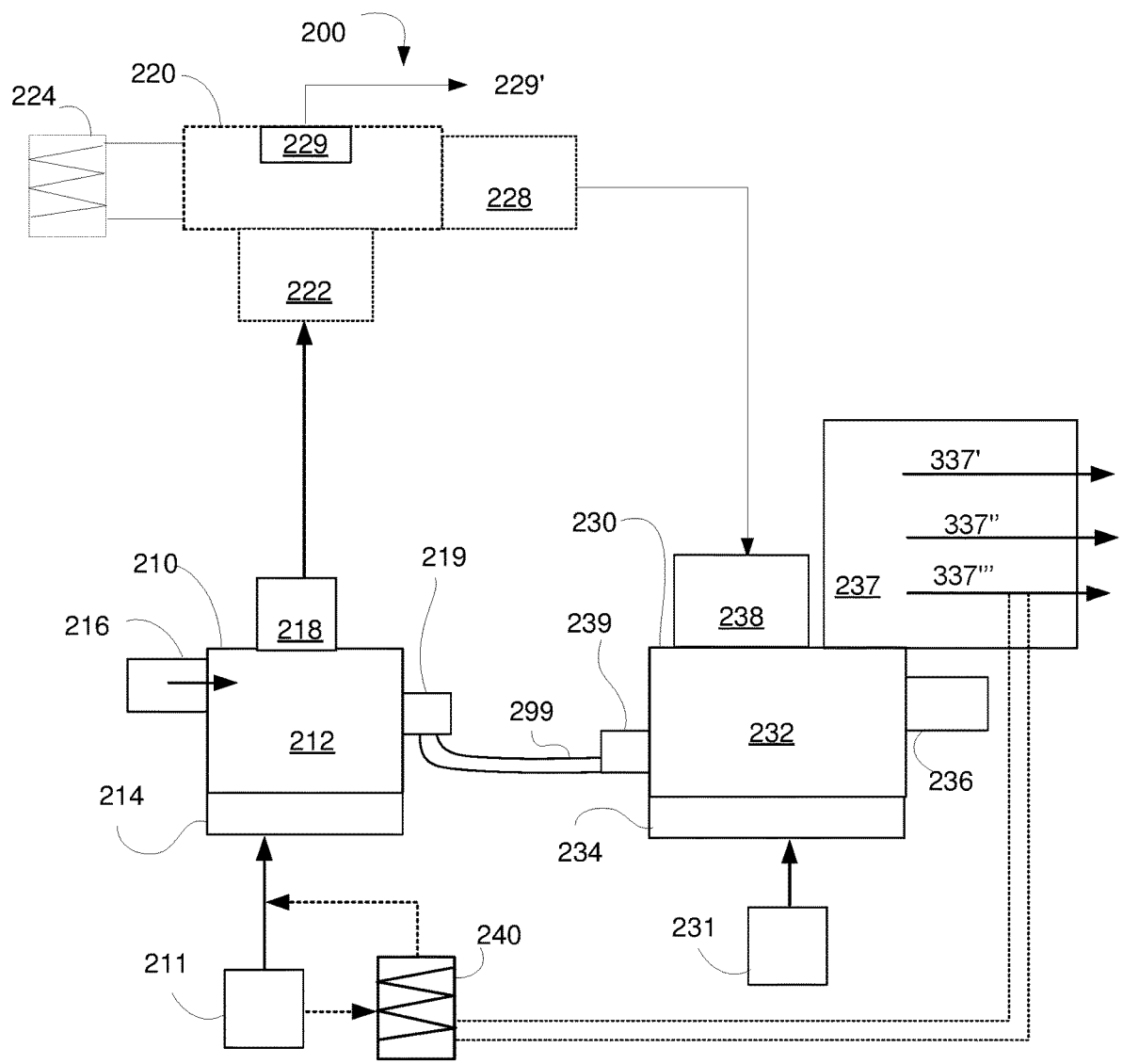
FIG. 2 is a schematic illustration of a fuel stream processing system, per some embodiments.

FIG. 2 is a schematic illustration of a fuel stream processing system, per some embodiments. A fuel stream processing system 200 may comprise a pretreatment reactor 210 fluidically coupled to a combustion reactor 230. The pretreatment reactor volatilizes an incoming fuel stream to form a volatiles stream. The volatilized stream typically includes useful chemical species 229', which are extracted via one or more chemicals outlets 229 (directly or after having been separated). Nonvolatilized fuel (char) is typically conveyed from the pretreatment reactor to a combustion reactor via a char stream, which burns the char stream to extract the heat value. The system may include a separation reactor 220 coupled to one or both of the reactors 210, 230. The pretreatment reactor may be retrofit to an existing combustion reactor (each reactor may have its own fuel supply).

Pretreatment reactor 210 receives the fuel stream via a fuel inlet 216, and pretreats (e.g., volatilizes/gasifies/pyrolyzes/reforms/reacts, herein: volatilizes) a portion of the received fuel to yield a volatiles stream and a char stream. Pretreatment/volatilization typically comprises treating the fuel in a reaction zone 212 with an inert and/or relatively less oxidizing gas than that used in the combustion reactor (e.g., N2, syngas, steam, CO2, and the like), delivered via gas inlet 214 from a gas supply 211. The pretreatment reactor outputs a volatiles stream via a volatiles stream outlet 218. The char stream is output via a char stream outlet 219 to a char stream inlet 239 of the combustion reactor 230, where it is combusted with a relatively more oxidizing gas (e.g., air, O2). The pretreatment reactor and combustion reactor may be discrete (e.g., with the char stream outlet/inlet coupled via a passage 299). The pretreatment reactor and combustion reactor may be integrated (e.g., with the char stream outlet/inlet forming an opening in a wall between the reactors). In some cases, to prevent undesired reactions (e.g., polymerization, decomposition, precipitation), the pretreatment reactor may include a fast pyrolysis reactor (e.g., that constrains volatiles to a residence time below 10 seconds, including below 3 seconds).

Combustion reactor 230 (e.g., a combined heat and power plant) includes a combustion zone 232 within which the char stream is reacted with an oxidant gas (e.g., air, oxygen, and the like). An oxidant supply 231 delivers oxidant via an oxidant inlet 234. In some embodiments, one or both of the inlets 214, 234 comprise diffuser plates (e.g., such that the respective reactors can function as fluidized beds). Combustion reactor 230 includes an exhaust 237, and may include an optional second fuel inlet 236 configured to deliver a fuel directly into the combustion reactor. Combustion of char may be augmented with fuel from the second fuel inlet 236 and corresponding supplementary fuel supply (not shown), which may be the main fuel supply to the combustion reactor (e.g., when retrofitting a pretreatment reactor to an existing combustion reactor).

The volatiles stream outlet of the pretreatment reactor may be coupled to a separation reactor 220 (e.g., a fast condensation/fractionation reactor, a cyclone, ESP, filter, scrubber, bath-quenching, and the like) via a volatiles stream inlet 222. Separation reactor 220 may extract and/or isolate desirable chemicals from the volatiles stream, outputting these species via chemicals outlet 229. A heat exchanger 224 (e.g., coupled to the separation reactor) may be used to remove heat from the volatiles stream, enhancing condensation. A heat exchanger 224 may be used to transfer heat from the volatiles stream to a fluidization gas delivered by a gas inlet. A separation reactor may include a heat exchanger 224, a cyclone 225, a phase separator 226 configured to separate condensed species from more volatile species (e.g., a filter, bag house, electrostatic precipitator, FIG. 3). A phase separator may comprise several phase separators. Water, ash, media, acids, and condensable fuels may be separated. For example, a first separator may remove ash, a second separator may remove condensable fuels (e.g., tar), and a third separator (e.g., an electrostatic precipitator) may remove particles, aerosols, and the like. A residual stream comprising CO, CO2, H2, and other permanent gases may be sent for combustion (e.g., in a lime kiln or other combustor).

A reactor may include an absorption loop that exposes a stream to a liquid that condenses/absorbs a species (e.g., a water-based scrubber or an amine CO2 scrubber). The liquid is circulated out, the species is removed, and the liquid is reexposed to the stream. In some cases, the liquid/species are removed and replaced with fresh scrubbing liquid. In some cases, separation reactor 220 outputs a residuals stream (e.g., comprising residual chemicals not extracted for other purposes) via residuals stream outlet 228. Residuals stream outlet 228 may be coupled to a corresponding residuals stream inlet 238 of the combustion reactor, providing for the combustion of the residuals stream.

A heat exchanger 340 may be coupled to the exhaust stream (e.g., via exhaust 237) of the combustion reactor 230 to preheat the pretreatment fluidization gas prior to its introduction into the pretreatment reactor via gas inlet 214.

A volatiles stream may have a range of uses (according to fuel source, pretreatment conditions, and the like) such as for raw gas, syngas, and the like. The volatiles stream may include syngas (e.g., for use in a subsequent chemical process) gaseous species (e.g., gaseous fuels), liquid fuels (e.g., biofuels and/or biofuel precursors), and the like.

A fuel stream processing system may comprise one or more fluidized bed reactors. For example, pretreatment reactor 210 may be configured as a volatilization stage of a fluidized bed reactor as described herein, and combustion reactor 230 may be configured as a combustion stage of a fluidized bed reactor as described herein. The reactors may share a fluidized bed of solids (e.g., separated by a wall) providing for a flow of char (and typically bed solids) from the pretreatment reactor to the combustion reactor. The system may be implemented as a standalone system and/or retrofit to an existing combustion reactor (e.g., an existing fluidized bed boiler). The fuel stream processing system need not incorporate a fluidized bed reactor.

Figure 3:
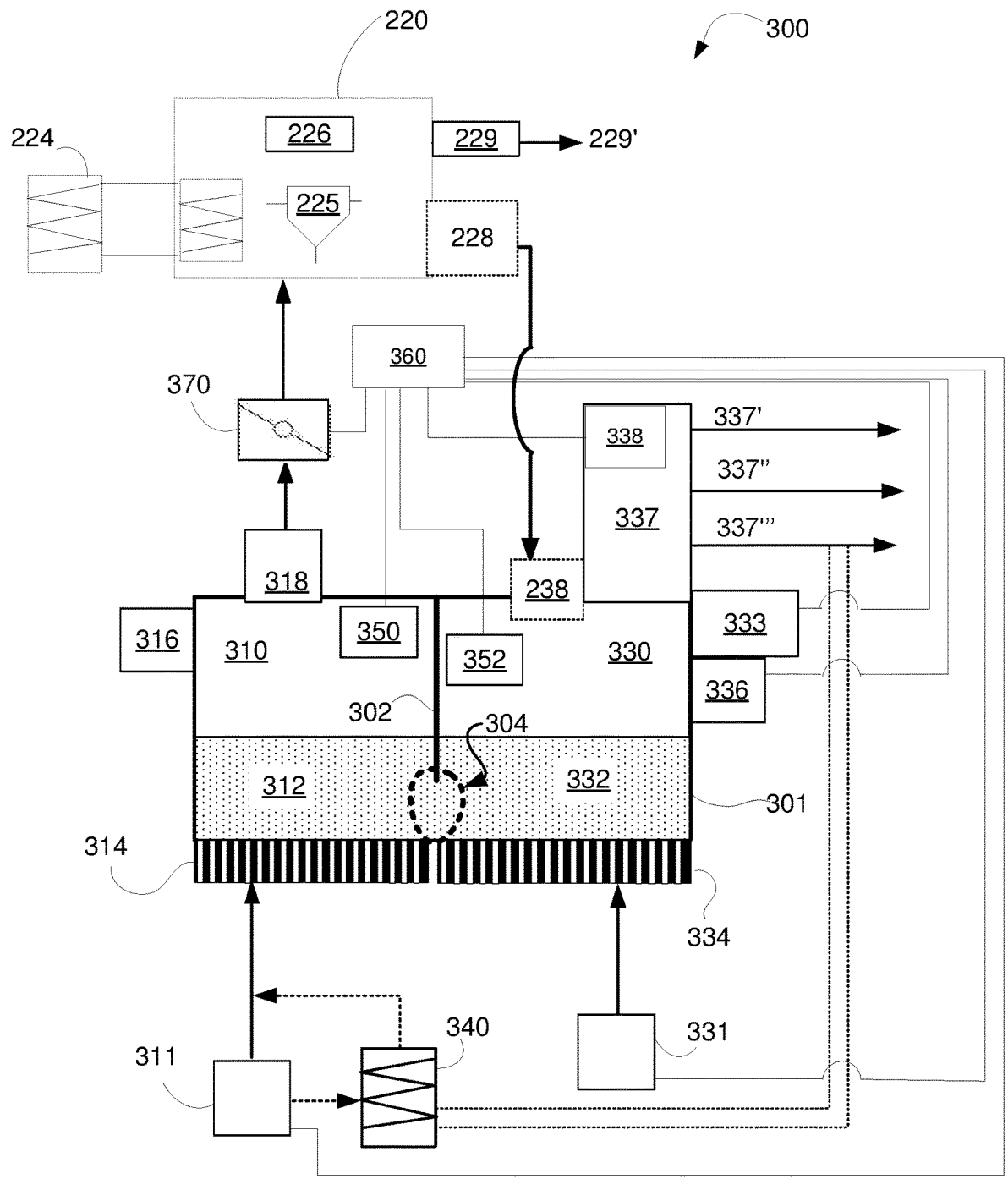
FIG. 3 is a schematic illustration of a two-stage fluidized bed reactor, per some embodiments.

FIG. 3 is a schematic illustration of a two-stage fluidized bed reactor, per some embodiments. A multistage fluidized bed reactor comprises an otherwise contiguous fluidized bed (e.g., one BFB) having at least a first (e.g., volatilization) and second (e.g., combustion) stages, each stage enabling a different chemical reaction. In this example, a first reaction zone 312 in a first portion of the fluidized bed and a second reaction zone 332 in a second portion of the fluidized bed provide for different reactions.

The first and second stages are separated, typically by a wall. The wall separates the gas phases above each stage, but allows the fluidized bed phases to communicate via an opening in the wall and/or a passage between beds of the stages. Thus, the fluidized bed phase (e.g., media and char stream) may flow between the stages, but the gas phase above the first stage is separated from the gas phase above the second stage. The fluidized beds may communicate via openings in the floor rather than the wall. The fuel residence time and/or transfer of fuel and bed material from the first to second stages is typically controlled via an increased/decreased gas pressure in the first stage vs. that in the second stage and/or the gas pressures supplied to the fluidization gas inlets. A controller coupled to pressure gauges within the stages may control these pressures (e.g., via a valve on the volatiles stream) to achieve a desired overpressure of the first stage vs. the second stage.

In exemplary FIG. 3, a fluidized bed reactor 300 comprises a container 301 (in this example, a single container) configured to hold a bed of bed solids. A wall 302 separates the container into a volatilization stage 310 and a combustion stage 330. Wall 302 may have an opening 304 through which bed solids and char may flow. Opening 304 may include char stream outlet 219, char stream inlet 239, and/or passage 299 (FIG. 2). Opening 304 may comprise openings in the floors of each stage, coupled by a passage. Wall 302 may include a plurality of walls. The media and char stream pass from the volatilization stage to the combustion stage, where the char is burned. The wall lets the media/char pass between stages, but prevents mixing of the gas phase in the volatilization stage with the oxidizing gas phase in the combustion stage.

The volatilization stage has a fuel inlet 316 configured to receive and deliver the fuel into the volatilization stage. The fuel inlet may include a lock hopper and/or other apparatus to transfer solid fuel while controlling gas flow/pressure. Fuel may be fed by gravity and/or auger. Fuel may be delivered to the lock hopper (e.g., via a feed screw) and a gas pressure within the lock hopper may be controlled to match that of the volatilization stage, such that fuel may be delivered to the volatilization stage at or above the pressure of the volatilization stage.

The bed solids are fluidized by a flow of gas from a LowOx gas supply 311 delivered via a gas inlet 314 (e.g., a diffuser plate/distributor plate having holes of any size and shape distributed across the plate to fluidize the bed) corresponding to the portion of the container (or the container) associated with the volatilization stage (e.g., first reaction zone 312). LowOx gas supply 311 supplies a (typically hot) gas chosen according to desired volatilization conditions (e.g., inert, reducing, mildly oxidizing), fuel source, desired composition of volatiles stream, and the like. The LowOx gas is typically mildly oxidizing (less oxidizing than that yielding complete combustion, e.g., steam, CO2, small amounts of oxygen, N2). The LowOx gas may, in some cases, be reducing (e.g., H2). Pressure drop across the distributor plate (Pd1−Pd2, FIG. 4) may be controlled (typically in concert with gas pressure at the top of the bed) to achieve a desired bubble size and/or bubble volume (within the bed), convection pattern, fuel residence time, bed temperature, and the like. Bed temperature and various reactions may be controlled via stage pressure (e.g., to control bed height, reaction rates, and/or residence times). A typical volatilization stage may have a lower temperature at the top of the bed than at the bottom (although in the absolute bottom of the bed (the first centimeters from the bottom) where the fluidization media enters the bed, the temperature is typically lower). A reduced bed height in the volatilization stage typically reduces residence time within.

A volatiles stream outlet 318 is configured to convey the volatiles stream out of the volatilization stage (e.g., to an optional separation reactor 220). A fuel processing system may comprise a separation reactor coupled to the volatilization stage and configured to separate out one or more chemical species from the volatiles stream. Useful species are typically extracted from the volatiles stream, yielding a residual stream, which may be sent to the combustion stage via a residuals line, where they are burned (FIG. 2). A volatiles pressure gauge 350 measures gas pressure in the volatilization stage, the volatiles stream outlet, and/or the corresponding volatiles line.

A reactor includes a means to control gas flow into and/or out of at least one stage, including multiple stages. Controlling this means in concert with pressure measurements, the controller may control the pressure difference between stages, typically via closed-loop (e.g., PID) control. In an embodiment, a volatiles outlet valve 370 (e.g., a butterfly valve) coupled to the volatilization stage outlet 318 is configured to control pressure in the volatilization stage and/or flow out of the volatiles stream outlet. FIG. 3 shows valve 370 upstream of separation reactor 220; it may be downstream.

Combustion stage 330 includes an oxidant inlet 334 (e.g., a diffuser plate) correspondingly disposed at the portion of the container associated with combustion (e.g., second reaction zone 332). An oxidant supply 331 coupled to the oxidant inlet delivers a relatively more oxidizing gas (typically air) at a flow rate and pressure sufficient to fluidize the bed solids in the combustion stage and combust the char from the volatilization stage. An exhaust gas outlet 337 removes combustion products power 337', chemicals 337", and/or heat 337''' from the combustion stage, which may be subsequently harvested from the exhaust gas (e.g., via a heat exchanger, a turbine, and the like). A combustion pressure gauge 352 disposed in the combustion stage and/or exhaust measures pressure in the combustion stage. Reactor 300 illustrates an optional $2^{nd}$ oxidant inlet 333 (e.g., to provide additional combustion air to supplement oxidant supplied via oxidant inlet 334). Additional gas and/or oxidant inlets may be included with the relevant stage. In this example, a fan 338 fluidically coupled to the exhaust 337 controllably extracts exhaust gas, which may be used to control pressure.

A controller 360 coupled to the pressure gauges (in this case, 350, 352) controls a pressure difference between the stages. In FIG. 3, controller 360 is coupled to the volatiles outlet valve 370, and controls pressure in the volatilization stage via throttling of the valve. During operation, controller 360 typically controls pressure of the volatilization stage to be different than that of the combustion stage. Lower pressure in the volatilization stage typically decreases fuel/char residence time; higher pressure typically reduces residence time. Pressures may be controlled via a valve on the flue gas line and/or relative flow rates of the fluidizing gas inlets. Pressure control of bed solids flow (and the resulting mass transfer rates) may be used to control residence time within the stages (e.g., in a pretreatment stage prior to a combustion stage).

A combustion stage may include a second fuel inlet 336 (e.g., to supplement the fuel value of the char), which may include a separate (or the same) fuel supply, typically with its own lock hopper. Second fuel inlet 336 may be the main fuel supply for the combustion stage, with a separate fuel supply implemented for the volatilization stage (e.g., as a retrofit to an existing combustion stage). A retrofit implementation may comprise a BFB volatilization stage retrofit into an existing BFB combustor to create a multistage BFB reactor.

The reactor may include a heat exchanger 340 configured to extract heat from the exhaust gas and transfer heat to the gas supplied to the volatilization stage (as shown) and/or the combustion stage (not shown), which may improve energy efficiency.

Increased gas pressure in the first stage may drive char and bed material into the second stage. In some cases, natural convection of the bed material recirculates at least some media back into the first stage from the second stage. FIG. 3 illustrates an implementation in which the floor heights of the two stages are the same; the floor heights may be different. FIG. 3 illustrates the volatilization stage coupled to an optional separation reactor 220 which, in this case, has a residual stream outlet 228 coupled to a corresponding residual stream inlet 238 of the combustion stage, such that the residual stream may be combusted. A residual stream may comprise syngas, raw gas, tar, and the like. A residual stream may comprise other gases, liquids, solids, and the like, and need not go to the combustion stage.

Figure 4:
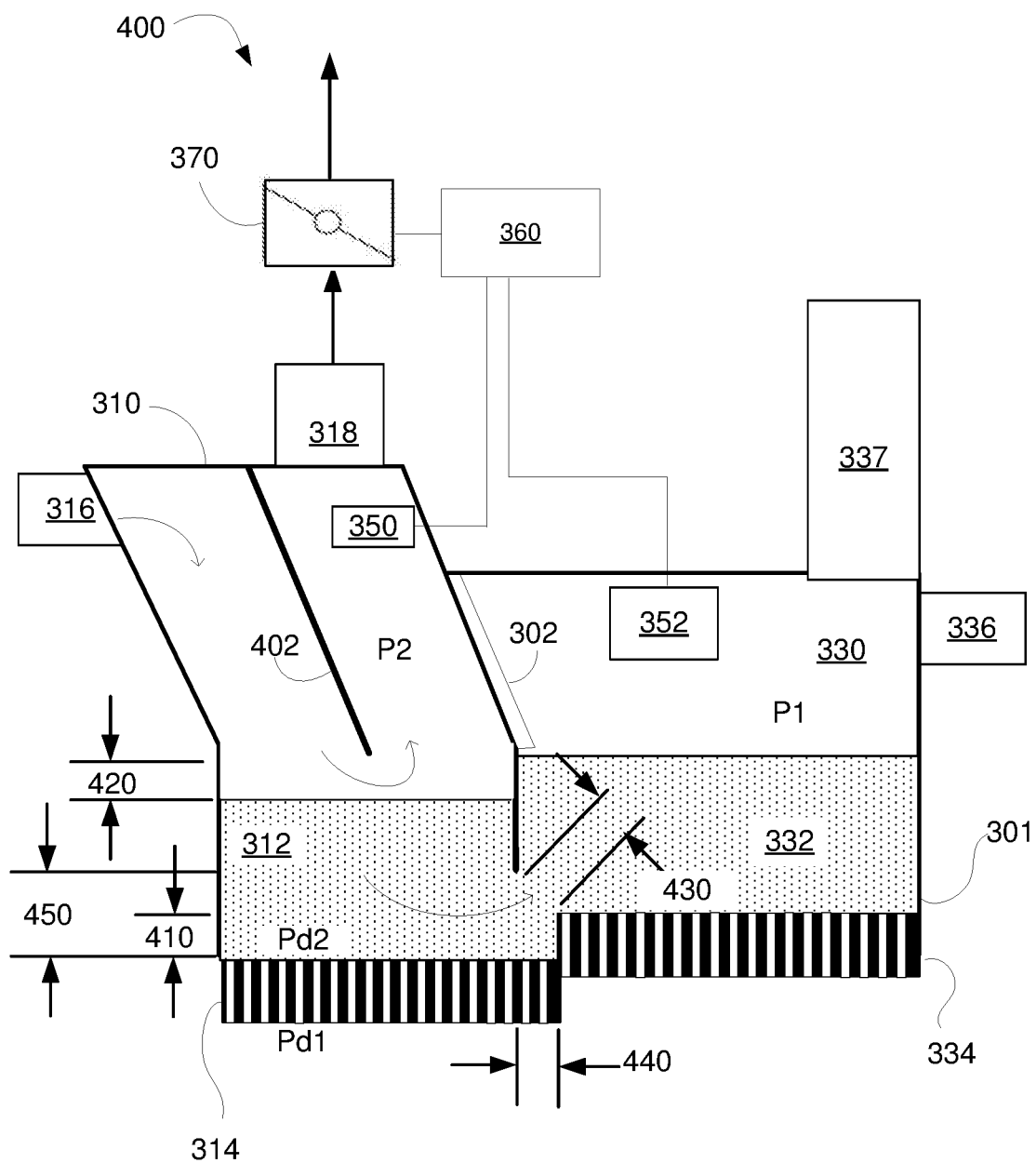
FIG. 4 is a schematic illustration of a two-stage fluidized bed reactor, per some embodiments.

FIG. 4 illustrates a two-stage fluidized bed reactor, per some embodiments. FIG. 4 schematically illustrates an exemplary effect of overpressure in the volatilization stage on the difference in the surface heights of the beds in the two stages, and also illustrates different floor heights. A volatilization stage 310 may have a fuel inlet 316 and volatiles stream outlet 318 separated by an internal wall 402. In this example, an internal wall 402 separates at least a portion of the gas phases of the fuel inlet and volatiles outlet, so that fuel passes into the bed without interfering with the volatiles exiting the volatilization stage. In FIG. 4, wall 402 does not extend into the fluidized bed of the volatilization stage 310, allowing for some (indirect) gaseous communication between the fuel inlet and volatiles outlet without going through the bed. The volatiles outlet and fuel inlet are held at the same pressure in this example. FIG. 4 illustrates a slanted fuel inlet 316, which may enhance gravity assist. Other gravity-assisted mechanisms may be used. Insulation or thermally conductive material may be incorporated into wall 302 to reduce or increase heat transfer through wall 302. The wall 302 separating the volatilization and combustion stages may be slanted.

Wall 302 need not extend into the bed solids at the same location as the transition between the gas inlets 314 and 334. In FIG. 4, an extension length 440 defines a distance between the transition between gas inlets and the location of wall 302. In this example, wall 302 extends into the bed solids within the volatilization stage 310 (upstream of the transition between stages). Wall 302 may extend into the bed solids within the combustion stage 330 (downstream of the transition).

In some cases, the floor height of a stage is different than that of another stage, as shown in FIG. 4. A system may have a desired floor height difference 410 (typically controlled structurally/mechanically) and/or a desired bed surface height difference 420, typically controlled via pressure difference between the two beds. The extension distance of wall 302 into the bed, extension length 440, a distance 450 from the lower edge of the wall to the floor below, and/or the floor heights, may be used to define a transfer area 430 between the two beds. The transfer area may have a horizontal component (e.g., allowing for vertical bed flow) and/or a vertical component (e.g., allowing for horizontal bed flow), and is typically designed using Computational Fluid Design (CFD) tools to model bed flow and heat transfer between the stages. The transfer area is typically designed to achieve a desired heat and/or mass transfer between the beds (typically in concert with an expected pressure difference). Bed solids may be directed (e.g., horizontally) through a transfer area to enhance flow. For example, a reactor may include a splashgenerator (e.g., a high velocity gas jet) configured to impart a directed momentum to a local portion of bed solids (e.g., with a jet of high velocity gas), typically at least partially horizontally. For example, a splashgenerator may be used to increase circulation rates within a transfer area (directing flow into or out of a stage). Certain reactors include a stage having an adjustable floor height, which may provide independent pressure control (of the gas phases in the stages) and bed depths within each stage. Such control may be used to ensure both passage of the char stream from the first to second stage and recirculation of the bed media from the second to first stage.

For example, extraction of a combustible gas produced from a combustible solid or liquid may implement a single fluidized bed reactor having multiple stages. A combustion stage, where part of the cross section of the reactor vessel is fluidized with air, may be preceded by a volatilization stage, in which extraction and/or reaction is performed in a secondary reactor volume in which the fuel residence time is controlled by adjusting the pressure difference between the stages. A pressure difference between the stages ($P_1-P_2$, FIG. 4) and the pressure drop relationships across the distributor plate and the fluidized bed beneath the second reactor volume (($P_{d2}-P_2$)/($P_{d1}-P_{d2}$) FIG. 4) as well as the effective distance 450 (FIG. 4) between the distributor plate and the lower end wall 302 of the secondary reactor volume may be controlled. In some embodiments, an extracted volatiles stream has a lower heating value higher than, including at least two times higher than, the average heating value of the total gas volume leaving the volatilization and combustion stages.

Figure 5:
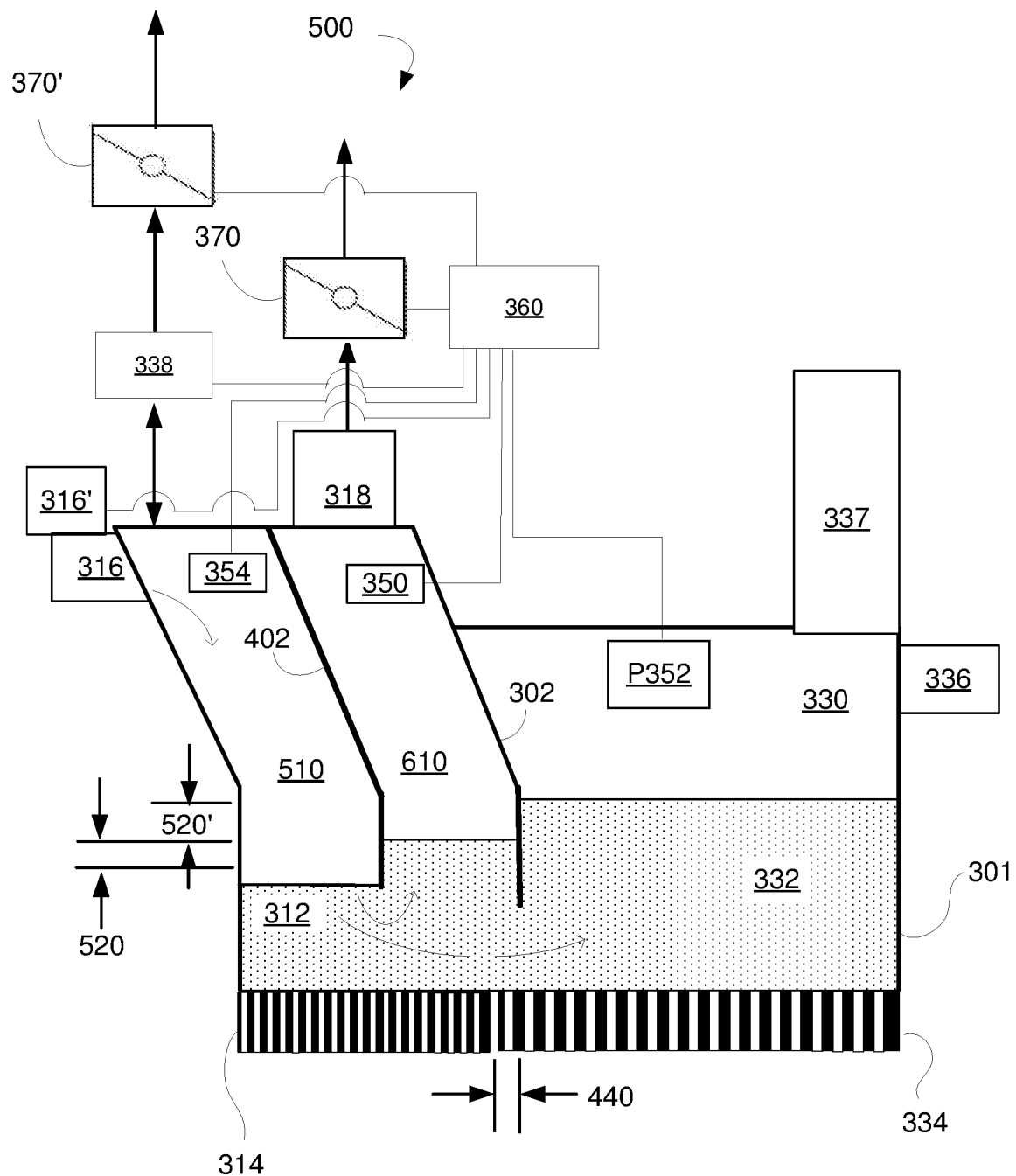
FIG. 5 illustrates a three-stage reactor with an internal wall separating the gas phases of the fuel inlet and volatiles outlet, per some embodiments.

FIG. 5 illustrates a three-stage reactor with an internal wall separating the gas phases of the fuel inlet and volatiles outlet, per some embodiments. In this example, internal wall 402 extends into the bed of the volatilization stage, separating this stage into an inlet stage 510 (in communication with the fuel inlet 316) and a reforming stage 610 (in communication with the volatiles outlet 318). Reforming stage 610 may be used for reforming reactions or other reactions. In descending below the surface of the bed, internal wall 402 forces all material (including gases) through the bed before volatiles may exit, and prevents gas-phase communication between the fuel inlet 316 and volatiles stream outlet 318.

The depth (into the bed) and thickness (in the flow direction) of the internal wall 402 may be chosen according to a desired residence time within the bed. FIG. 5 illustrates an additional pressure gauge 354 coupled to the controller, providing for separate pressure control over the inlet and reforming stages 510, 610 of the volatilization stage (e.g., via a separate valve 370' and/or gas inlet 316' providing for gas control into and/or out of inlet stage 510.

In this example, a second fuel inlet 336 provides additional fuel for the third (combustion) stage, and all three stages having the same floor height. This example schematically illustrates highest pressure in stage 510, lower pressure in stage 610, and lowest pressure in stage 330, resulting (in this case) in shorter distances between bed surface and floor. FIG. 5 illustrates differences 520, 520' between the surface heights of the beds of adjacent stages. The difference in heights of the bed surfaces may be controlled via corresponding pressure differences to achieve a desired flow rate (e.g., mass transfer equalization between fuel inlet 316, volatiles outlet 318, and exhaust 337. In this example, the stages have the same floor height (they may be different). In an embodiment, stages 510 and 610 have separate gas inlets and gas supplies (e.g., to deliver a different gas to the inlet stage than the reforming stage, which may be different than that delivered to the combustion stage. The distance from the lowermost edge of a wall to the bottom of a stage may be chosen according to a desired transfer area 430 (FIG. 4). In this example, a fan 338 is included to pump gas into or out of stage 510. FIG. 5 illustrates a single volatiles stream outlet 318 extracting volatiles from stage 610; and additional volatiles stream outlet may extract volatiles from stage 510. Stages 510 and 610 may have independent gas inlets (e.g., stage 510 is fluidized with exhaust gas recovered from exhaust 337 and stage 610 is fluidized with steam). Both stages may be fluidized with steam, N2, CO2, and the like.

Figure 6:
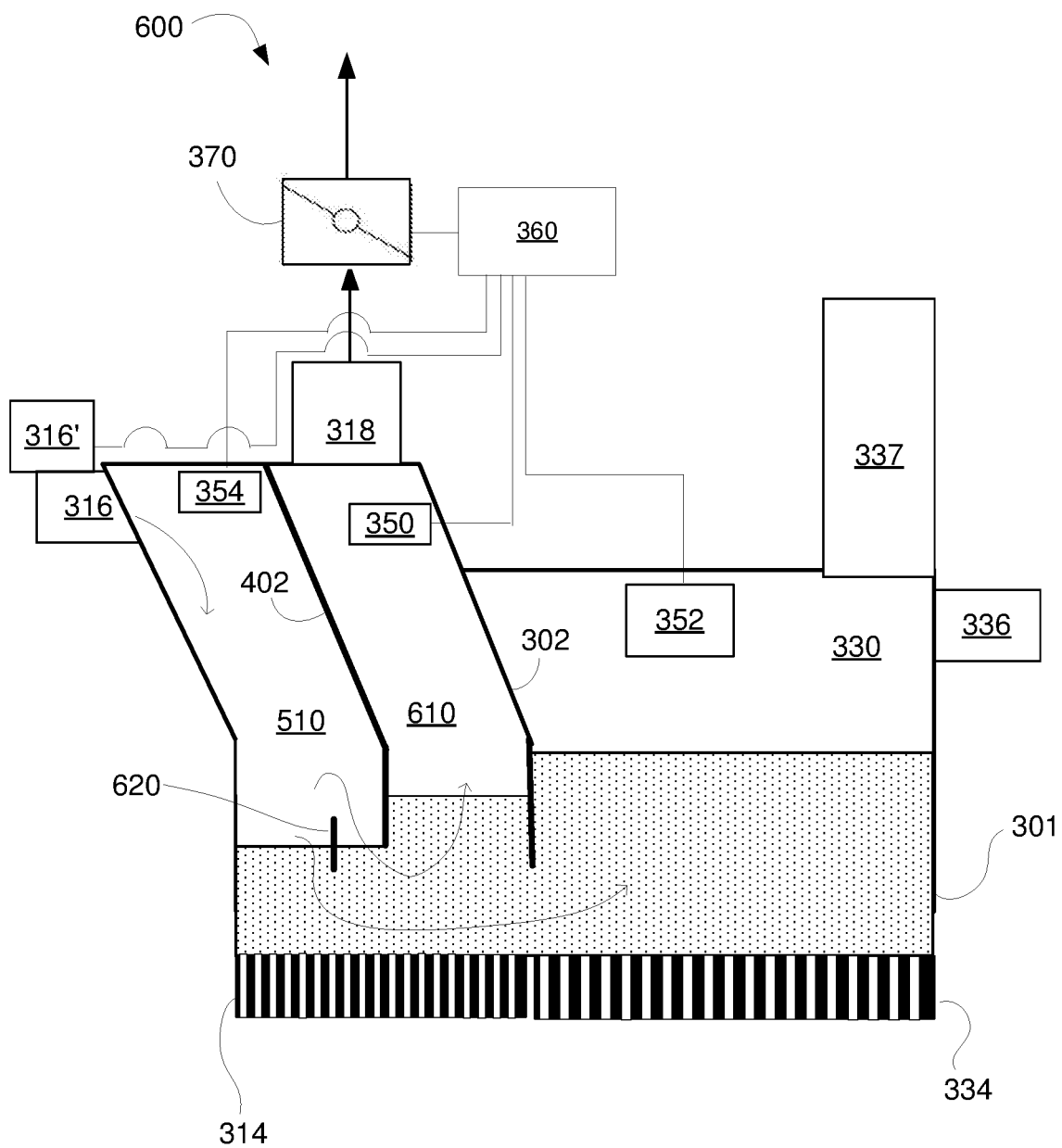
FIG. 6 illustrates a three-stage reactor with an internal wall separating the gas phases of the fuel inlet and volatiles outlet, per some embodiments.

FIG. 6 illustrates a three-stage reactor with an internal wall separating the gas phases of the fuel inlet and volatiles outlet, per some embodiments. In this example, wall 302 extends into the bed at the transition between the volatilization and combustion stages, and internal wall 402 separates the volatilization stage into an inlet stage 510 and a reforming stage 610.

FIG. 6 illustrates a baffle 620 (in this example, disposed at the current surface of the bed of the inlet stage 510. A baffle may be used to force non-gaseous fuel to pass through the bed for a certain amount of time. Baffle 620 typically extends sufficiently above the surface of the bed (e.g., above the bubble zone), such that fuel cannot pass over the baffle. Fuel must pass beneath the baffle to move from the portion of the bed in communication with the fuel inlet to the portion in communication with the volatiles outlet (and by extension, into the combustion stage). Baffle depth and thickness may be chosen according to a desired residence time in the bed. This example shows a constant floor height across the stages. A baffle may be used to segregate surface solids (e.g., incoming fuel), creating an internal "dam" (e.g., close to the fuel inlet) while keeping a portion of the bed open to the gas phase downstream of the baffle. A baffle may be disposed below the surface of the bed (e.g., at the bottom of the bed), including below a wall.

Internal upgrading of a combustible gas produced from a combustible solid or liquid is possible after extraction from a first fluidized bed reactor stage, where part of the cross section of the reactor vessel is fluidized with air and the extraction is achieved by the introduction of a secondary (upstream) reactor stage in which the fuel residence time is controlled by adjusting the pressure difference between the stages and the pressure drop relation between the pressure drop across the distributor plate and the hydrostatic pressure at the bottom of the fluidized bed(s), as well as lengths, distances and areas (450, 440, 430 FIG. 4) between and among the distributor plate(s) and the wall separating the stages. In some embodiments, the extracted gas has a lower heating value that is higher than, including at least two times higher than, the average heating value of the total gas volume leaving the primary (first zone) and secondary (second zone) reactor volumes, and where the upgrading of the extracted gas is achieved by the introduction of a third stage within the volatilization stage (with or without a baffle) to force all extracted gas to pass through a controlled height of bed material before the extraction of the volatiles.

Various features described herein may be implemented independently and/or in combination with each other. An explicit combination of features does not preclude the omission of any of these features from other embodiments. The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

The invention claimed is:

1. A fluidized bed reactor configured to react a fuel in a fluidized bed of bed solids, the reactor comprising:
   a container configured to hold the bed of bed solids;
   a wall separating at least a gas phase above the bed in the container into a volatilization stage and a combustion stage, the volatilization stage including:
   a fuel inlet configured to receive the fuel;
   a LowOx gas inlet disposed at a first portion of a bottom of the container;
   a LowOx gas supply configured to supply an inert and/or less-oxidizing gas to the LowOx gas inlet to fluidize the bed of bed solids and volatilize the fuel to yield:
   a volatiles stream comprising a syngas chemical species; and
   a char stream;

a volatiles stream outlet configured to convey the volatiles stream out of the volatilization stage;

a chemicals outlet coupled to the volatiles stream outlet and configured to extract the chemical species from the reactor; and a volatiles pressure gauge configured to measure pressure within the volatilization stage;

the combustion stage including:

an oxidant inlet disposed at a second portion of the bottom of the container;

a HiOx gas supply configured to supply the oxidant inlet with a gas that is more oxidizing than that supplied by the LowOx gas supply, the HiOx gas supply and oxidant inlet configured to fluidize the bed of bed solids and combust the char stream to yield an exhaust gas;

an exhaust gas outlet configured to convey the exhaust gas out of the combustion stage; and a combustion pressure gauge configured to measure pressure within the combustion stage;

an opening through and/or below the wall and below a surface of the bed solids, the opening configured to provide for a flow of the char stream and bed solids between the volatilization stage and the combustion stage;

means to control gas flow into/out of at least one stage; and a controller (360) coupled to the pressure gauges and the means to control gas flow, the controller configured to control a pressure difference (P1−P2) between the stages; wherein:

the volatilization stage further comprises an internal wall configured to separate at least the gas phases of the fuel inlet and volatiles stream outlet of the volatilization stage to yield an inlet stage and a reforming stage;

the volatiles pressure gauge and volatiles stream outlet are disposed in the reforming stage;

the reactor further comprises an inlet pressure gauge coupled to the controller and configured to measure pressure within the inlet stage; and the controller is configured to independently control the pressures within the inlet stage and the reforming stage.

2. The reactor of claim 1, further comprising a heat exchanger coupled to the exhaust gas outlet and LowOx gas supply, the heat exchanger configured to transfer heat from the exhaust gas to the inert and/or less-oxidizing gas prior to the LowOx gas inlet.

3. The reactor of claim 1, wherein the internal wall is configured to end just above the fluidized bed of the volatilization stage.

4. The reactor of claim 1, wherein the internal wall is configured to extend into the fluidized bed of the volatilization stage.

5. The reactor of claim 1, wherein:
the fuel comprises biomass;
the volatiles stream further comprises at least one of a biomass vapor, a wood extractive, a biofuel, and a biofuel precursor; and
the chemicals outlet is further configured to extract the at least one of the biomass vapor, the wood extractive, the biofuel, and the biofuel precursor from the reactor.

6. The reactor of claim 1, wherein the internal wall is slanted.

7. The reactor of claim 1, wherein
the LowOx gas supply is configured to supply a gas comprising steam, and the HiOx gas supply is configured to supply a gas comprising air and/or oxygen.

8. The reactor of claim 7, wherein the controller is further configured to control the pressure difference using closed-loop control.

9. The reactor of claim 1, wherein the inlet stage comprises a baffle disposed proximate to a surface of the fluidized bed.

10. The reactor of claim 1, further comprising
a separation reactor comprising the chemicals outlet and configured to separate out the chemical species from the volatiles stream.

11. The reactor of claim 10, wherein the separation reactor is further configured to separate a residual stream from the volatiles stream, and the reactor further comprises a residual stream outlet configured to deliver the residual stream from the separation reactor to the combustion stage.

12. The reactor of claim 10, wherein the separation reactor is further configured to cool the volatiles stream.

13. The reactor of claim 10, wherein the separation reactor comprises at least one of a scrubber and a quench bath.

14. The reactor of claim 10, wherein the separation reactor is further configured to separate a condensed species from a more volatile species.

15. The reactor of claim 1, wherein the controller is further configured to control the pressure difference using closed-loop control.

16. The reactor of claim 1, wherein the wall is disposed away from a transition between the LowOx gas inlet and the oxidant inlet by an extension length.

17. The reactor of claim 1, wherein a floor height of at least one stage is different than that of another stage.

18. A method comprising:
providing a fluidized bed reactor according to claim 1;
delivering a fuel to the volatilization stage;
delivering an inert, reducing, and/or mildly oxidizing gas to the volatilization stage with the LowOx gas supply to fluidize the bed of solids and at least partially volatilize the fuel;
delivering a gas to the combustion stage with the HiOx gas supply that is more oxidizing than that delivered to the volatilization stage, to combust the char stream; and
controlling a pressure difference (P1−P2) between the volatilization stage and the combustion stage.

19. The method of claim 18, wherein the fuel comprises biomass.

* * * * *